US011891093B2

(12) United States Patent
Watanabe et al.

(10) Patent No.: US 11,891,093 B2
(45) Date of Patent: Feb. 6, 2024

(54) CONTROL DEVICE, CONTROL METHOD, AND STORAGE MEDIUM FOR CONTROLLING A MOBILE DEVICE ALONG A CONDITIONS-VARYING TRAVEL PATH

(71) Applicant: HONDA MOTOR CO., LTD., Tokyo (JP)

(72) Inventors: Etsuo Watanabe, Tokyo (JP); Ryoichi Inoue, Wako (JP); Yuki Motegi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 17/364,921

(22) Filed: Jul. 1, 2021

(65) Prior Publication Data
US 2022/0001896 A1 Jan. 6, 2022

(30) Foreign Application Priority Data
Jul. 6, 2020 (JP) .................................. 2020-116373

(51) Int. Cl.
B60W 60/00 (2020.01)
B60W 40/04 (2006.01)
(Continued)

(52) U.S. Cl.
CPC ........ B60W 60/0021 (2020.02); B60W 40/04 (2013.01); B60W 50/14 (2013.01);
(Continued)

(58) Field of Classification Search
None
See application file for complete search history.

(56) References Cited

U.S. PATENT DOCUMENTS

2017/0259832 A1* 9/2017 Lathrop ............. G01C 21/3697
2017/0356747 A1* 12/2017 Iagnemma ......... G01C 21/3461
(Continued)

FOREIGN PATENT DOCUMENTS

CN 108216190 6/2018
CN 110770105 2/2020
(Continued)

OTHER PUBLICATIONS

"School Zone", Jan. 27, 2020, Wikipedia, all. (Year: 2020).*
(Continued)

Primary Examiner — James J Lee
Assistant Examiner — Andrew Sang Kim
(74) Attorney, Agent, or Firm — Amin, Turocy & Watson, LLP

(57) ABSTRACT

A control device that comprises a processor that executes instructions to cause a mobile object to travel autonomously is provided. The processor controls the mobile object based on a conditions-varying travel path so that an automated control of the mobile object does not change even if travel conditions of the conditions-varying travel path vary. The processor also executes instructions to determine a route to a destination. The processor determines the route using automated-driving map information that comprises a travel path other than the conditions-varying travel path when the mobile object travels by automated driving. The processor also determines the route using manual-driving map information that comprises the conditions-varying travel path when the mobile object travels by manual driving.

11 Claims, 11 Drawing Sheets

(51) Int. Cl.
  *G01C 21/34* (2006.01)
  *B60W 50/04* (2006.01)
  *B60W 50/14* (2020.01)

(52) U.S. Cl.
  CPC .... *B60W 60/0053* (2020.02); *B60W 60/0057* (2020.02); *G01C 21/3492* (2013.01); *B60W 2050/146* (2013.01); *B60W 2555/60* (2020.02); *B60W 2556/40* (2020.02)

(56) References Cited

U.S. PATENT DOCUMENTS

| | | | | |
|---|---|---|---|---|
| 2017/0370740 | A1* | 12/2017 | Nagy | G01C 21/3484 |
| 2018/0170382 | A1 | 6/2018 | Soliman et al. | |
| 2018/0203455 | A1* | 7/2018 | Cronin | B60W 60/0011 |
| 2020/0050209 | A1* | 2/2020 | Bai | G01C 21/3492 |
| 2020/0152059 | A1* | 5/2020 | Cohen | G01C 21/3691 |
| 2020/0168097 | A1 | 5/2020 | Kumano et al. | |
| 2020/0200552 | A1* | 6/2020 | Sood | G01C 21/3461 |
| 2020/0200558 | A1* | 6/2020 | Xu | G01C 21/3415 |
| 2021/0276550 | A1 | 9/2021 | Gotou et al. | |

FOREIGN PATENT DOCUMENTS

| | | |
|---|---|---|
| CN | 111231961 | 6/2020 |
| JP | 2006-200990 | 8/2006 |
| JP | 2017-078918 | 4/2017 |
| JP | 2017-175182 | 9/2017 |
| JP | 6387157 | 9/2018 |
| JP | 2019-059361 | 4/2019 |
| JP | 2019-077426 | 5/2019 |
| WO | 2001/094887 | 12/2001 |
| WO | 2019/008649 | 1/2019 |

OTHER PUBLICATIONS

"Reversible Lane", Jan. 19, 2020, Wikipedia, all. (Year: 2020).*
Japanese Office Action for Japanese Patent Application No. 2020-116373 dated Jun. 7, 2022.
Chinese Office Action for Chinese Patent Application No. 202110694825.8 dated Jul. 22, 2023.

* cited by examiner

| ROAD ID | POSITION INFORMATION | CONDITIONS VARIATION INFORMATION |
|---|---|---|
| RD001 | (**, **) | •7:30 A.M. ~ 9:00 A.M. → PROHIBITION OF TRAVEL IN LEFT LANE<br>•3:00 P.M. ~ 5:00 P.M. → PROHIBITION OF TRAVEL IN LEFT LANE |
| RD002 | (**, **) | •MONDAY ~ FRIDAY → SPEED LIMIT 50 [km/h]<br>•SATURDAY, SUNDAY → SPEED LIMIT 40 [km/h] |
| RD003 | (**, **) | •REVERSIBLE LANE (SWITCH OF CENTRAL LANE OUT OF FIVE LANES)<br>•10:00 P.M. ~ 3:59 P.M. → THREE LANES TOWARD DOWNTOWN<br>•4:00 P.M. ~ 9:59 P.M. → THREE LANES TOWARD SUBURBS |
| RD004 | (**, **) | •EVERY SUNDAY → PROHIBITION OF TRAVEL |
| ... | ... | ... |

CONTROL DEVICE, CONTROL METHOD, AND STORAGE MEDIUM FOR CONTROLLING A MOBILE DEVICE ALONG A CONDITIONS-VARYING TRAVEL PATH

CROSS-REFERENCE TO RELATED APPLICATION

Priority is claimed on Japanese Patent Application No. 2020-116373, filed Jul. 6, 2020, the content of which is incorporated herein by reference.

BACKGROUND

Field of the Invention

The present invention relates to a control device, a control method, and a storage medium.

Description of Related Art

Recently, automatic travel control of a vehicle has been studied. In this regard, there is a technique of causing a vehicle to park in an area in which a parking-impermissible time period is set at a time other than the parking-impermissible time period and causing the vehicle to move by forcibly switching the vehicle to automated driving immediately before the parking-impermissible time period starts (for example, see Japanese Patent No. 6387157).

SUMMARY

However, in the related art, since it is necessary to monitor time periods constantly and to perform travel control of a mobile object according to time periods, a processing load for the travel control may be large.

An aspect of the invention was made in consideration of the aforementioned circumstances and an objective thereof is to provide a control device, a control method, and a storage medium that can decrease a processing load for travel control of a mobile object.

A control device, a control method, and a storage medium according to the invention employ the following configurations.

(1) According to an aspect of the invention, there is provided a control device including a travel controller configured to cause a mobile object to travel autonomously, wherein the travel controller controls the mobile object such that a behavior in which control details for the mobile object do not change even if travel conditions of a conditions-varying travel path in which the travel conditions vary according to a time period vary is performed.

(2) In the aspect of (1), the control device may further include a determiner configured to determine whether a travel path along which the mobile object travels under the control of the travel controller includes a conditions-varying travel path in which travel conditions vary according to the time period, and the travel controller may control the mobile object such that a behavior in which the control details for the mobile object do not change even if the travel conditions of the conditions-varying travel path vary is performed when the determiner determines that the travel path includes the conditions-varying travel path.

(3) In the aspect of (1), the travel controller may cause the mobile object to travel along the conditions-varying travel path on the basis of a lower speed limit out of speed limits included in the travel conditions regardless of the time periods when the conditions-varying travel path is a travel path in which a speed limit varies according to the time period.

(4) In the aspect of (2), the travel controller may cause the mobile object to travel along a travel path other than the conditions-varying travel path regardless of the time periods when the determiner determines that the travel path includes the conditions-varying travel path.

(5) In the aspect of (4), the travel controller may cause the mobile object to travel along a travel path other than the conditions-varying travel path regardless of a time period in which travel of the mobile object is permissible when the conditions-varying travel path is a travel path in which travel permissibility of the mobile object varies according to the time period.

(6) In the aspect of (1), the travel controller may cause the mobile object to travel along the conditions-varying travel path on the basis of a lower speed limit out of speed limits included in the travel conditions regardless of the time periods when a variation of the travel conditions of the conditions-varying travel path is a variation in speed limit, and the travel controller may cause the mobile object to travel along a travel path other than the conditions-varying travel path when the variation of the travel conditions of the conditions-varying travel path is not the variation in speed limit.

(7) In the aspect of (1), the travel controller may switch the mobile object to manual driving control such that the mobile object is driven by a person's operation regardless of the time periods when the mobile object is caused to travel along the conditions-varying travel path.

(8) In the aspect of (1), the control device may further include an output controller configured to acquire candidates for a travel path from a current position of the mobile object to a destination and to cause an output to output information indicating the acquired candidates for a travel path, and the output controller may cause the output to output information including a travel path not including the conditions-varying travel path and a travel path including the conditions-varying travel path as the candidates for a travel path.

(9) In the aspect of (1), the control device may further include a route determiner configured to determine a route to a destination, and the route determiner may determine the route using a travel path other than the conditions-varying travel path.

(10) In the aspect of (1), the control device may further include a route determiner configured to determine a route to a destination, and the route determiner may determine the route using automated-driving map information including a travel path other than the conditions-varying travel path when the mobile object travels by automated driving and determine the route using manual-driving map information including the conditions-varying travel path when the mobile object travels by manual driving.

(11) In the aspect of (1), the control device may further include a determiner configured to determine whether the travel path along which the mobile object travels under the control of the travel controller includes a conditions-varying travel path in which travel conditions vary according to a natural environment, and the travel controller may control the mobile object such that a behavior in which control details for the mobile object do not change even if the travel conditions of the conditions-varying travel path vary is performed when the determiner determines that the travel path includes the conditions-varying travel path.

(12) According to another aspect of the invention, there is provided a control method which is performed by a computer, the control method including: causing a mobile object to travel autonomously; and controlling the mobile object such that a behavior in which control details for the mobile object do not change even if travel conditions of a conditions-varying travel path in which the travel conditions vary according to a time period vary is performed.

(13) According to another aspect of the invention, there is provided a non-transitory computer-readable storage medium storing a program, the program causing a computer to perform: causing a mobile object to travel autonomously; and controlling the mobile object such that a behavior in which control details for the mobile object do not change even if travel conditions of a conditions-varying travel path in which the travel conditions vary according to a time period vary is performed.

According to the aspects of (1) to (13), it is possible to decrease a processing load for travel control of a mobile object.

BRIEF DESCRIPTION OF THE DRAWINGS

FIG. 3 is a diagram illustrating details of conditions-varying road information.

DESCRIPTION OF EMBODIMENTS

Hereinafter, a vehicle control device, a vehicle control method, and a storage medium according to an embodiment of the invention will be described with reference to the accompanying drawings. In the following description, it is assumed that the control device is mounted in a mobile object. Examples of the mobile object include a vehicle, a ship, a flying object (for example, a drone or an aircraft), and a robot. In the following description, it is also assumed that the mobile object is a vehicle, a travel path is a road, and a vehicle is an automated-driving vehicle. Automated driving means, for example, that driving control is performed by controlling steering and a speed of a vehicle. Driving of the automated-driving vehicle may be controlled by manual driving for moving a vehicle in response to an operation of a person (for example, a driver such as an occupant or a remote controller). In the following description, it is assumed that the rule of driving on the left-hand side is applied, but right and left may be exchanged with each other when the rule of driving on the right-hand side is applied.

[Entire Configuration]

Figure 1:
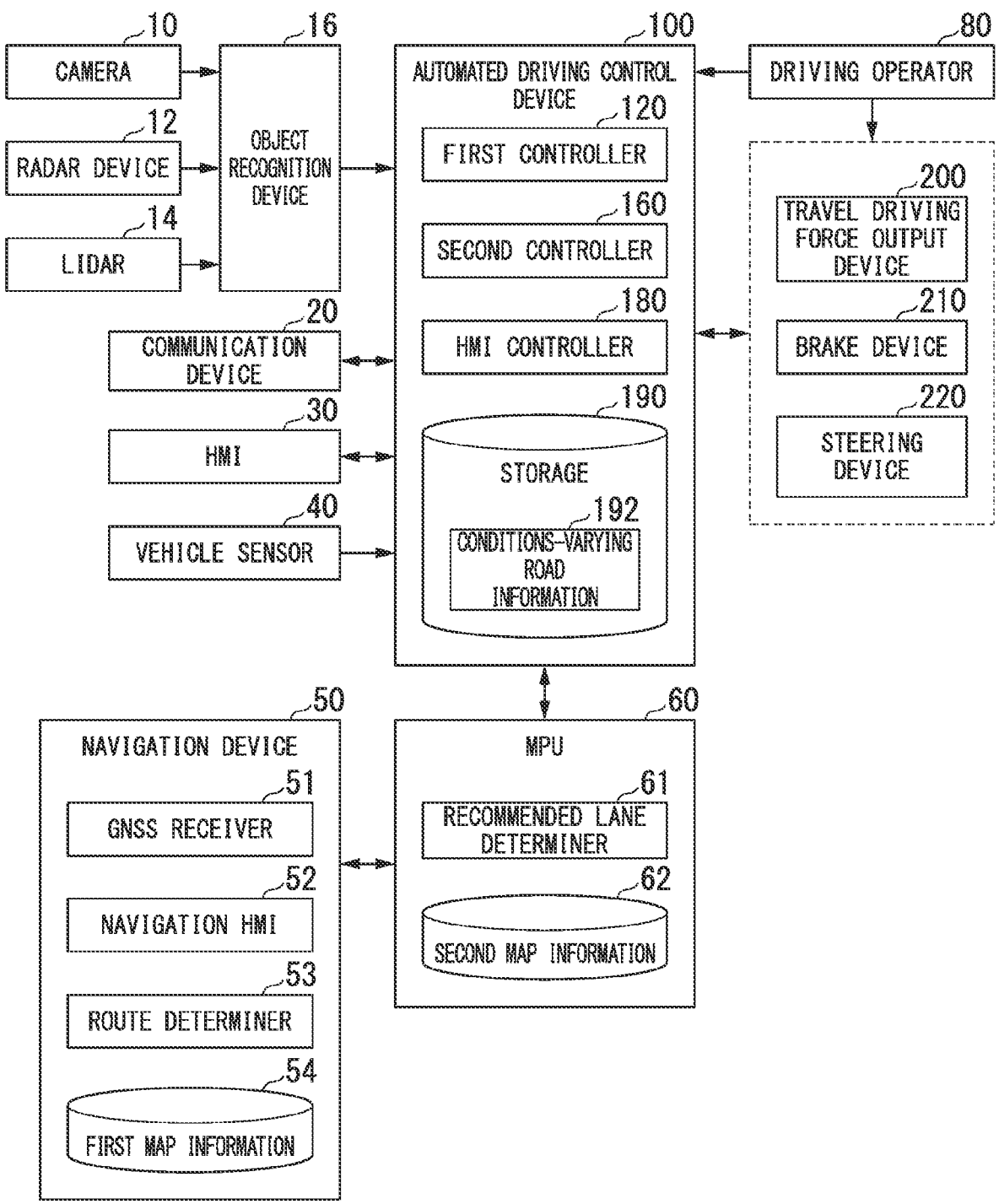
FIG. 1 is a diagram illustrating a configuration of a vehicle system including a control device according to an embodiment.

FIG. 1 is a diagram illustrating a configuration of a vehicle system 1 including a control device according to an embodiment. A vehicle in which the vehicle system 1 is mounted (hereinafter referred to as a vehicle M) is, for example, a vehicle with two wheels, three wheels, or four wheels and a drive source thereof is an internal combustion engine such as a diesel engine or a gasoline engine, an electric motor, or a combination thereof. An electric motor operates using electric power which is generated by a power generator connected to the internal combustion engine or electric power which is discharged from a battery (a storage battery) such as a secondary battery or a fuel cell.

The vehicle system 1 includes, for example, a camera 10, a radar device 12, a light detection and ranging (LIDAR) 14, an object recognition device 16, a communication device 20, a human-machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 1 is only an example and a part of the configuration may be omitted or another configuration may be added thereto. A combination of the navigation device 50 and the automated driving control device 100 is an example of a "control device." A combination of the camera 10, the radar device 12, the LIDAR 14, and the object recognition device 16 is an example of an "external sensor." The HMI 30 is an example of an "output."

The camera 10 is, for example, a digital camera using a solid-state imaging device such as a charge coupled device (CCD) or a complementary metal oxide semiconductor (CMOS). The camera 10 is attached to an arbitrary position on the vehicle M in which the vehicle system 1 is mounted. For example, when the front view of the vehicle M is imaged, the camera 10 is attached to an upper part of a front windshield, a rear surface of a rearview mirror, a front head of a vehicle body, or the like. When the rear view of the vehicle M is imaged, the camera 10 is attached to an upper part of a rear windshield, a backdoor, or the like. When the side view of the vehicle M is imaged, the camera 10 is attached to a door mirror or the like. The camera 10 images surroundings of the vehicle M, for example, periodically and repeatedly. The camera 10 may be a stereoscopic camera.

The radar device 12 radiates radio waves such as millimeter waves to the surroundings of the vehicle M, detects radio waves (reflected waves) reflected by an object near the vehicle M, and detects at least a position (a distance and a direction) of the object. The radar device 12 is attached to an arbitrary position on the vehicle M. The radar device 12 may detect a position and a speed of an object using a frequency modulated continuous wave (FM-CW) method.

The LIDAR 14 radiates light to the surroundings of the vehicle M and measures scattered light. The LIDAR 14 detects a distance to an object on the basis of a time from emission of light to reception of light. The light which is applied is, for example, a pulse-like laser beam. The LIDAR 14 is attached to an arbitrary position on the vehicle M.

The object recognition device 16 performs a sensor fusion process on results of detection from some or all of the camera 10, the radar device 12, and the LIDAR 14 and recognizes a position, a type, a speed, and the like of an object near the vehicle M. Examples of the object include another vehicle (a nearby vehicle such as a preceding vehicle), a pedestrian, a bicycle (which includes a driver of the bicycle), and a road structure. Examples of the road structure include a road sign, a traffic sign, an edge of a roadside, a curbstone, a median, a guard rail, and a fence. The road structure may further include a road surface marking such as a road marking, a pedestrian crossing, a bicycle crossing, or a stop line which is drawn or added on a road surface. The object recognition device 16 outputs the results of recognition to the automated driving control device 100. The object recognition device 16 may output the results of detection from the camera 10, the radar device 12, and the LIDAR 14 to the automated driving control device 100 without any change. In this case, the object recognition device 16 may be omitted from the vehicle system 1 or outside sensors. The object recognition device 16 may be provided in the automated driving control device 100 (for example, a recognizer 130 which will be described later).

The communication device 20 communicates with external devices such as other vehicles near the vehicle M, a terminal device of a user who uses the vehicle M, or various server devices, for example, using a network such as a cellular network, a Wi-Fi network, Bluetooth (registered trademark), or dedicated short range communication (DSRC), a local area network (LAN), a wide area network (WAN), or the Internet.

The HMI 30 outputs various types of information to an occupant of the vehicle M and receives an input operation from the occupant. The HMI 30 includes, for example, various display devices, speakers, buzzers, a touch panel, switches, keys, and a microphone.

The vehicle sensor 40 includes a vehicle speed sensor that detects a speed of the vehicle M, an acceleration sensor that detects an acceleration, a yaw rate sensor that detects a yaw rate (for example, an angular velocity around a vertical axis passing through the center of gravity of the vehicle M), and a direction sensor that detects a direction of the vehicle M. The vehicle sensor 40 may further include a position sensor that detects a position of the vehicle M. The position sensor is, for example, a sensor that acquires position information (longitude and latitude information) from a global positioning system (GPS) device. The position sensor may be a sensor that acquires position information using a global navigation satellite system (GNSS) receiver 51 of the navigation device 50. Results of detection from the vehicle sensor 40 are output to the automated driving control device 100.

The navigation device 50 includes, for example, a GNSS receiver 51, a navigation HMI 52, and a route determiner 53. The navigation device 50 stores first map information 54 in a storage device such as a hard disk drive (HDD) or a flash memory. The GNSS receiver 51 identifies the position of the vehicle M on the basis of signals received from GNSS satellites. The position of the vehicle M may be identified or complemented by an inertial navigation system (INS) using the output of the vehicle sensor 40. The navigation HMI 52 includes a display device, a speaker, a touch panel, and keys. The GNSS receiver 51 may be provided in the vehicle sensor 40. The navigation HMI 52 may be partially or overall shared by the HMI 30. For example, the route determiner 53 determines a route (hereinafter referred to as a route on a map) from the position of the vehicle M identified by the GNSS receiver 51 (or an input arbitrary position) to a destination input by an occupant using the navigation HMI 52 with reference to the first map information 54. The first map information 54 is, for example, information in which road shapes are expressed by links indicating roads and nodes connected by the links. The first map information 54 may include point of interest (POI) information. The route on a map is output to the MPU 60. The navigation device 50 may perform route guidance using the navigation HMI 52 on the basis of the route on a map. The navigation device 50 may transmit a current position and a destination to a navigation server via the communication device 20 and acquire a route which is equivalent to the route on a map from the navigation server. The navigation device 50 outputs the determined route on a map to the MPU 60.

The MPU 60 includes, for example, a recommended lane determiner 61 and stores second map information 62 in a storage device such as an HDD or a flash memory. The recommended lane determiner 61 divides the route on a map supplied from the navigation device 50 into a plurality of blocks (for example, every 100 [m] in a vehicle travel direction) and determines a recommended lane for each block with reference to the second map information 62. The recommended lane determiner 61 determines in which lane from the leftmost the vehicle is to travel. When there is a branching point in the route on a map, the recommended lane determiner 61 determines a recommended lane such that the vehicle M can travel on a rational route for traveling to a branching destination. The recommended lane determiner 61 may determine a recommended lane under the control of a second controller 160 or an HMI controller 180.

The second map information 62 is map information with higher precision than the first map information 54. The second map information 62 includes, for example, information on a road shape or road structures. The road shape may include, for example, the number of lanes, a radius of curvature (or a curvature) of a road, a width, and a gradient which are more detailed road shapes than those in the first map information 54. This information may be stored in the first map information 54. Information on road structures may include information on types, positions, directions with respect to an extending direction of the road, sizes, shapes, and colors of the road structures. The second map information 62 may include position information (latitude and longitude), address information (addresses and postal codes), and facility information. The second map information 62 may be updated from time to time by causing the communication device 20 to communicate with an external device. The first map information 54 and the second map information 62 may be integrated as map information. The map information (the first map information 54 and the second map information 62) may be stored in a storage 190.

The driving operator 80 includes, for example, a steering wheel, an accelerator pedal, and a brake pedal that are operated by an occupant. The driving operator 80 may include a shift lever, a deformed steering wheel, a joystick, and other operators. For example, an operation detector that detects an amount of operation of each operator or performing of an operation by an occupant may be attached to each operator of the driving operator 80. The operation detectors detect, for example, a steering angle or a steering torque of the steering wheel and an amount of depression of the accelerator pedal or the brake pedal. The operation detectors output the results of detection to the automated driving control device 100, the travel driving force output device 200, and one or both of the brake device 210 and the steering device 220.

The automated driving control device 100 includes, for example, a first controller 120, a second controller 160, an HMI controller 180, and a storage 190. The first controller 120, the second controller 160, and the HMI controller 180 are realized, for example, by causing a hardware processor such as a central processing unit (CPU) to execute a program (software). Some or all of such constituents may be realized by hardware (which includes circuitry) such as a large scale integration (LSI), an application specific integrated circuit (ASIC), or a field-programmable gate array (FPGA), or a graphics processing unit (GPU) or may be realized in cooperation of software and hardware. The program may be stored in a storage device (a storage device including a non-transitory storage medium) such as an HDD or a flash memory of the automated driving control device 100 in advance, or may be stored in a removable storage medium such as a DVD, a CD-ROM, or a memory card and installed in the storage device of the automated driving control device 100 by inserting the removable storage medium (the non-transitory storage medium) into a drive device, a card slot, or the like. The HMI controller 180 is an example of an "output controller."

The storage 190 may be realized by various storage devices described above, an electrically erasable programmable read only memory (EEPROM), a read only memory (ROM), a random access memory (RAM), or the like. For example, conditions-varying road information 192, various types of other information, and programs are stored in the storage 190. Map information (for example, the first map information 54 and the second map information 62) may be stored in the storage 190. Details of the conditions-varying road information 192 will be described later.

Figure 2:
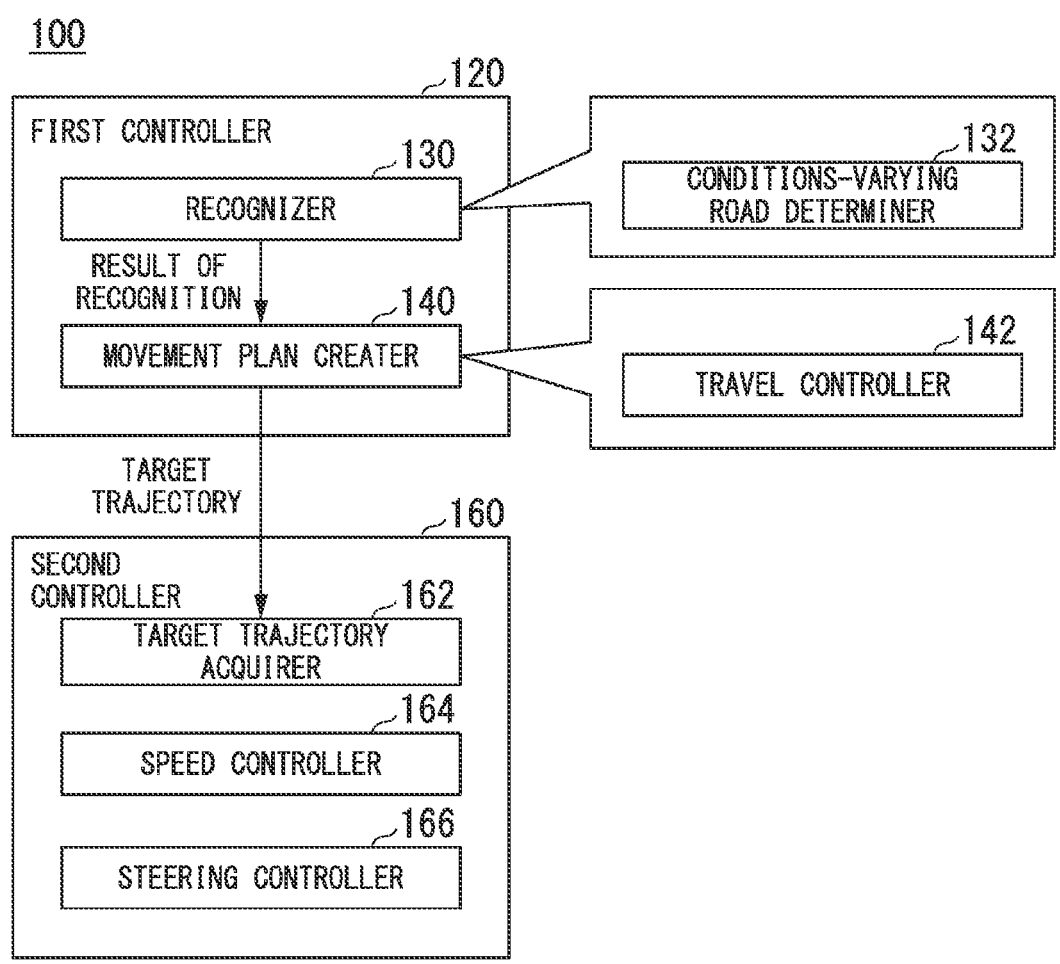
FIG. 2 is a diagram illustrating a functional configuration of a first controller and a second controller.

FIG. 2 is a diagram illustrating functional configurations of the first controller 120 and the second controller 160. The first controller 120 includes, for example, a recognizer 130 and a movement plan creator 140. The first controller 120 is realized, for example, by performing a function based on artificial intelligence (AI) and a function based on a predetermined model together. For example, a function of "recognizing a crossing" may be embodied by performing recognition of a crossing based on deep learning or the like and recognition based on predetermined conditions (such as signals and road signs which can be pattern-matched) together, scoring both recognitions, and comprehensively evaluating both recognitions. Accordingly, reliability of automated driving is secured. The first controller 120 performs control for automated driving of the vehicle M, for example, on the basis of an instruction from the MPU 60 or the HMI controller 180.

The recognizer 130 recognizes states such as a position, a speed, and an acceleration of an object near the vehicle M on the basis of information input from the camera 10, the radar device 12, and the LIDAR 14 via the object recognition device 16. For example, a position of an object is recognized as a position in an absolute coordinate system with an origin set to a representative point of the vehicle M (such as the center of gravity or the center of a drive shaft) and is used for control. A position of an object may be expressed as a representative point (a reference position) such as the center of gravity, a corner, or an end of the object or may be expressed as a drawn area. For example, when an object is a mobile object such as another vehicle, a "state" of the object may include an acceleration or a jerk of the mobile object or a "moving state" (for example, whether another vehicle is performing lane change or is going to perform lane change) thereof.

The recognizer 130 includes, for example, a conditions-varying road determiner 132. The conditions-varying road determiner 132 is an example of a "determiner." Details of a function of the conditions-varying road determiner 132 will be described later.

The movement plan creator 140 creates a movement plan with which the vehicle M will travel by travel control such as automated driving on the basis of the result of recognition from the recognizer 130. The movement plan creator 140 creates, for example, a target trajectory in which the vehicle M will travel autonomously (without requiring a driver's operation) in the future such that the vehicle M travels in a recommended lane determined by the recommended lane determiner 61 in principle and copes with surrounding conditions of the vehicle M on the basis of the result of recognition from the recognizer 130 or a nearby road shape based on the current position of the vehicle M acquired from the map information. A target trajectory includes, for example, a speed element. For example, a target trajectory is expressed by sequentially arranging points (trajectory points) at which the vehicle M is to arrive. Trajectory points are points at which the vehicle M is to arrive at intervals of a predetermined traveling distance (for example, about several [m]) along a road, and a target speed and target acceleration at intervals of a predetermined sampling time (for example, about below the decimal point [sec]) are created as a part of a target trajectory in addition. Trajectory points may be positions at which the vehicle M is to arrive at sampling times every predetermined sampling time. In this case, information of a target speed or target acceleration is expressed by intervals between the trajectory points.

The movement plan creator 140 may set events of automated driving in creating a target trajectory. The events may include, for example, a constant-speed travel event in which the vehicle M travels in the same lane at a constant speed, a following travel event in which the vehicle M travels to follow another vehicle which is located within a predetermined distance (for example, within 100 [m]) in front of the vehicle M and which is closest to the vehicle M (hereinafter referred to as a preceding vehicle), a lane change event in which the vehicle M changes its travel lane from a current lane to a neighboring lane, a branching event in which the vehicle M moves to a destination lane at a branching point of a road, a merging event in which the vehicle M moves to a main lane at a merging point, and a take-over event in which automated driving is ended and switched to manual driving. For example, the events may further include an overtaking event in which the vehicle M temporarily changes its travel lane to a neighboring lane, overtakes a preceding vehicle in the neighboring lane, and changes the travel lane to the original lane again and an avoidance event in which at least one of braking and steering of the vehicle M is performed to avoid an obstacle which is located in front of the vehicle M.

For example, the movement plan creator 140 may change an event which is determined already for a current section to another event or set a new event for the current section on the basis of the surrounding conditions of the vehicle M which are recognized while the vehicle M is traveling. The movement plan creator 140 may change an event which has been set already for a current section to another event or set a new event for the current section on the basis of an occupant's operation of the HMI 30. The movement plan creator 140 creates a target trajectory based on the set event.

The movement plan creator 140 includes, for example, a travel controller 142. Details of the function of the travel controller 142 will be described later.

The second controller 160 controls the travel driving force output device 200, the brake device 210, and the steering device 220 such that the vehicle M travels along a target trajectory created by the movement plan creator 140 as scheduled. A combination of the movement plan creator 140 and the second controller 160 is an example of a "driving controller."

The second controller 160 includes, for example, a target trajectory acquirer 162, a speed controller 164, and a steering controller 166. The target trajectory acquirer 162 acquires information of a target trajectory (trajectory points) created by the movement plan creator 140 and stores the acquired information in a memory (not illustrated). The speed controller 164 controls the travel driving force output device 200 or the brake device 210 on the basis of a speed element accessory to the target trajectory stored in the memory. The steering controller 166 controls the steering device 220 on the basis of a curve state of the target trajectory stored in the memory. The processes of the speed controller 164 and the steering controller 166 are realized, for example, in combination of feed-forward control and feedback control. For example, the steering controller 166 performs feed-forward control based on a radius of curvature (or a curvature) of a road in front of the vehicle M and feedback control based on separation from the target trajectory in combination.

Referring back to FIG. 1, the HMI controller 180 notifies an occupant of the vehicle M of predetermined information by outputting the predetermined information to the HMI 30. The predetermined information includes, for example, information associated with travel of the vehicle M such as information on the state of the vehicle M or information on driving control thereof. The information on the state of the vehicle M includes, for example, a speed, an engine rotation speed, and a shift position of the vehicle M. The information on driving control includes, for example, information indicating whether to perform driving control based on automated driving, information for inquiring about whether automated driving is to be started, information for prompting an occupant to perform manual driving, and information on a driving control state based on automated driving. The predetermined information may also include information not associated with travel control of the vehicle M such as television programs or contents (for example, the movies) stored in a storage medium such as a DVD. The predetermined information may include, for example, information on a current position or a destination of the vehicle M in automated driving, a route to the destination, and a residual amount of fuel of the vehicle M. The HMI controller 180 may generate an image or speech including information which is output to the HMI 30. The HMI controller 180 may output information received by the HMI 30 to the communication device 20, the navigation device 50, the first controller 120, and the like. The HMI controller 180 may transmit various types of information which is output to the HMI 30 to a terminal device of a user (an occupant) of the vehicle M via the communication device 20.

The travel driving force output device 200 outputs a travel driving force (a torque) for allowing the vehicle M to travel to the driving wheels. The travel driving force output device 200 includes, for example, a combination of an internal combustion engine, an electric motor, and a transmission and an electronic control unit (ECU) that controls these elements. The ECU controls the elements on the basis of information input from the second controller 160 or information input from the accelerator pedal which is the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of information input from the second controller 160 or information input from the brake pedal of the driving operator 80 such that a brake torque based on a braking operation is output to vehicle wheels. The brake device 210 may include a mechanism for transmitting a hydraulic pressure generated by an operation of the brake pedal to the cylinder via a master cylinder as a backup. The brake device 210 is not limited to the above-mentioned configuration, and may be an electronically controlled hydraulic brake device that controls an actuator on the basis of information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second controller 160 or the information input from the steering wheel of the driving operator 80 such that the direction of the turning wheels changes.

[Conditions-Varying Road Determiner]

Details of the function of the conditions-varying road determiner 132 will be described below. The conditions-varying road determiner 132 determines whether a road (an example of a travel path) on which the vehicle M travels includes a conditions-varying road (an example of a conditions-varying travel path) in which conditions at the time of travel of the vehicle M (hereinafter referred to as travel conditions) vary according to a time period. For example, the road on which the vehicle M travels may be a road on which the vehicle M is traveling or a road on which the vehicle is scheduled to travel in the near future (a road in front in a travel direction, a road included in a route to a destination, or the like). For example, the conditions-varying road determiner 132 may retrieve information indicating the road on which the vehicle M travels from map information (the first map information 54 and the second map information 62) on the basis of the position information of the vehicle M detected by the vehicle sensor 40 or the GNSS receiver 51. For example, the information indicating a road may be a road ID which is identification information for identifying the road. The road ID may be identification information for identifying a link of a road, identification information for identifying a plurality of links in a lump, or identification information for identifying some sections of a link. The conditions-varying road determiner 132 determines whether the road on which the vehicle M travels is a conditions-varying road with reference to the conditions-varying road information 192 stored in the storage 190 on the basis of the acquired road ID.

FIG. 3 is a diagram illustrating details of the conditions-varying road information 192. For example, the conditions-varying road information 192 is information in which conditions variation information is correlated with a road ID or position information. The position information is, for example, position information for identifying a position of a road corresponding to a road ID. For example, the position information may be position information of a road section (area) correlated with a road ID or position information indicating start and end of a road section. The conditions variation information includes, for example, information indicating travel limits or a travel rule (hereinafter referred to as travel conditions) according to a time period of a road correlated with a road ID. A time period may include, for example, a time section based on days of a week or a time section based on dates or a period in addition to a time section based on two times.

In the example illustrated in FIG. 3, a road with a road ID "RD001" represents that travel on a left lane is prohibited in time periods of 7:00 A.M. to 9:00 A.M. and 3:00 P.M. to 5:00 P.M. A road with a road ID "RD002" represents that a speed limit of the road on Monday to Friday is 50 [km/h] and the speed limit varies to 40 [km/h] on Saturday and Sunday. A road with a road ID "RD003" is a reversible lane including five lanes and represents that the number of travelable lanes toward downtown in a time period of 10:00 P.M. to 3:59 P.M. is three and the number of lanes travelable toward suburbs in a time period of 4:00 P.M. to 9:59 P.M. is three by switching a central lane. A road with a road ID "RD004" represents that travel is prohibited every Sunday.

The conditions-varying road information 192 may be updated from time to time by causing the communication device 20 to communicate with an external device. The conditions-varying road information 192 may be included in map information (the first map information 54 and the second map information 62).

The conditions-varying road determiner 132 retrieves a conditions variation information correlated with a road ID of a road on which the vehicle M travels with reference to the conditions-varying road information 192 using the road ID. When the road ID of the road on which the vehicle M travels is not included in the road IDs of the conditions-varying road information 192 or when conditions variation information correlated with the road ID is not included therein, the conditions-varying road determiner 132 determines that the road on which the vehicle M travels does not include a conditions-varying road. When conditions variation information correlated with the same road ID as the road ID of the road on which the vehicle M travels is included in the road IDs of the conditions-varying road information 192, the conditions-varying road determiner 132 determines that the road on which the vehicle M travels includes a conditions-varying road, and acquires conditions variation information correlated with the road ID.

The conditions-varying road determiner 132 may retrieve a conditions-varying road which is a road corresponding to the position information of the vehicle M detected by the vehicle sensor 40 or the GNSS receiver 51 with reference to the conditions-varying road information 192 using the position information instead of the road ID. In this case, when position information including the position information of the vehicle M is not included in the conditions-varying road information 192 or when conditions variation information correlated with the position information is not included therein, the conditions-varying road determiner 132 determines that the road on which the vehicle M travels does not include a conditions-varying road. When conditions variation information correlated with the position information including the position information of the vehicle M is not included in the conditions-varying road information 192, the conditions-varying road determiner 132 determines that the road on which the vehicle M travels includes a conditions-varying road, and acquires conditions variation information correlated with the position information.

[Travel Controller]

Details of the function of the travel controller 142 will be described below. The travel controller 142 controls a behavior of the vehicle M, for example, by automated driving such that the vehicle M travels autonomously. For example, when a destination is set by the navigation device 50, the travel controller 142 allows the vehicle M to travel autonomously along a route from the current position of the vehicle M to the destination. The travel controller 142 performs control for travel of the vehicle M (travel control) on the basis of the result of determination from the conditions-varying road determiner 132. The travel control may include, for example, control for generating a target trajectory of the vehicle M with respect to roads on the basis of the result of recognition from the recognizer 130 or the like and causing the second controller 160 to control the speed and the steering such that the vehicle M travels along the target trajectory.

Travel control of the vehicle M according to the embodiment will be specifically described below in conjunction with several control rules. In the following description, an example in which conditions variation information is retrieved using a road ID is mainly described, but conditions variation information may be retrieved on the basis of position information.

<First Control Rule>

Figure 4:
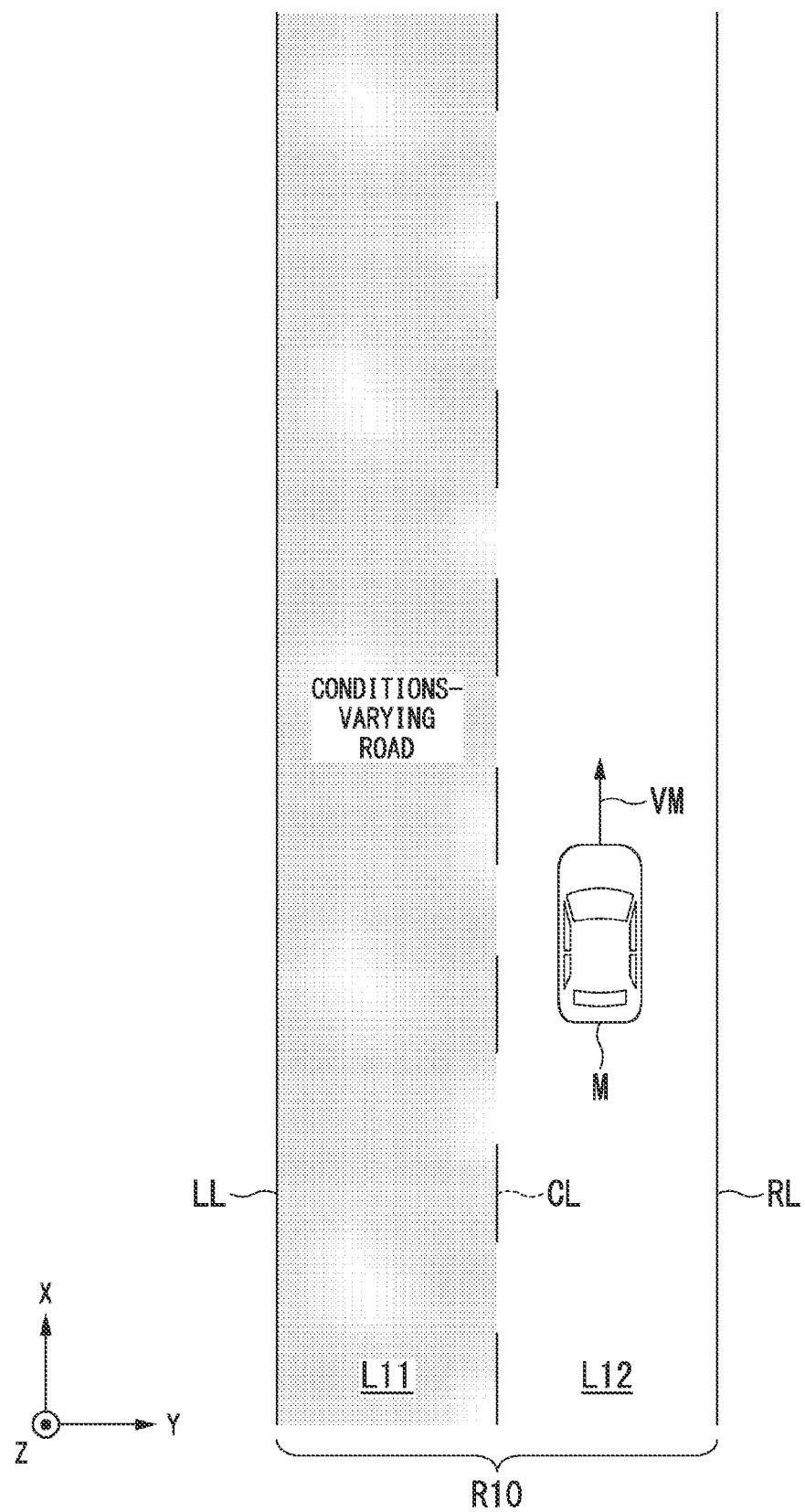
FIG. 4 is a diagram illustrating travel control of a vehicle M based on a first control rule.

FIG. 4 is a diagram illustrating travel control of a vehicle M based on a first control rule. In the example illustrated in FIG. 4, a road R10 of two lanes including a lane L11 and a lane L12 extending in an X-axis direction is illustrated. The lanes L11 and L12 are lanes travelable in the same direction. The lane L11 is defined by road making lines LL and CL and the lane L12 is defined by road marking lines CL and RL.

For example, when the conditions-varying road determiner 132 determines that the road R10 does not include a conditions-varying road, the travel controller 142 performs travel control for causing the vehicle M to travel along one of the lanes L11 and L12. When the conditions-varying road determiner 132 determines that the road R10 includes a conditions-varying road, the travel controller 142 causes the vehicle M to travel autonomously such that a behavior in which control details for the vehicle M in automated driving do not change is performed on the basis of conditions variation information correlated with the road R10.

In describing a first control rule, it is assumed that the road ID of the road R10 is "RD001." In this case, the conditions-varying road determiner 132 performs retrieval with reference to the road IDs in the conditions-varying road information 192 using "RD001" as a retrieval key and acquires conditions variation information correlated with "RD001" as a result of retrieval.

The travel controller 142 ascertains that the left lane L11 of the road R10 is a conditions-varying road in which travel is prohibited according to a time period on the basis of the acquired conditions variation information. Then, when the vehicle M travels on the road R10, the travel controller 142 performs control such that the vehicle M travels in a lane (the lane L12) other than the left lane at a speed VM regardless of a time period of traveling as a first control rule. That is, the travel controller 142 causes the vehicle M to travel in the lane L12 such that details of the behavior of the vehicle M do not vary according to a time period when the vehicle M is caused to travel on the road R10 by automated driving control. In this way, according to the first control rule, since monitoring of the time while the vehicle M is traveling or control for changing the behavior of the vehicle M according to travel conditions do not need to be performed in the automated driving, it is possible to decrease a processing load for travel control. It is also possible to decrease development costs for the monitoring of the time or the control of variation in behavior.

<Second Control Rule>

Travel control of a vehicle M based on a second control rule will be described below. In an example of the second control rule, it is assumed that the road ID of the road R10 is "RD002." The conditions-varying road determiner 132 performs retrieval with reference to the road IDs in the conditions-varying road information 192 using the road ID "RD002" as a retrieval key and acquires conditions variation information including travel conditions in which a speed limit of the lanes L11 and L12 of the road R10 varies according to days of a week as a result of retrieval.

When the aforementioned conditions variation information is acquired, the travel controller 142 performs control such that the vehicle M travels at a lower speed limit (40 [km/h] in the example illustrated in FIG. 3) out of the speed limits by days of a week included in the travel conditions when the vehicle M is caused to travel on the road R10 as the second control rule. In this way, according to the second control rule, since automated driving in which the vehicle M is caused to travel continuously at a lower speed (a lowest speed) regardless of the days of the week is performed, it is possible to cause the vehicle to travel at a speed with higher security and to decrease a processing load for travel control.

<Third Control Rule>

Figure 5:
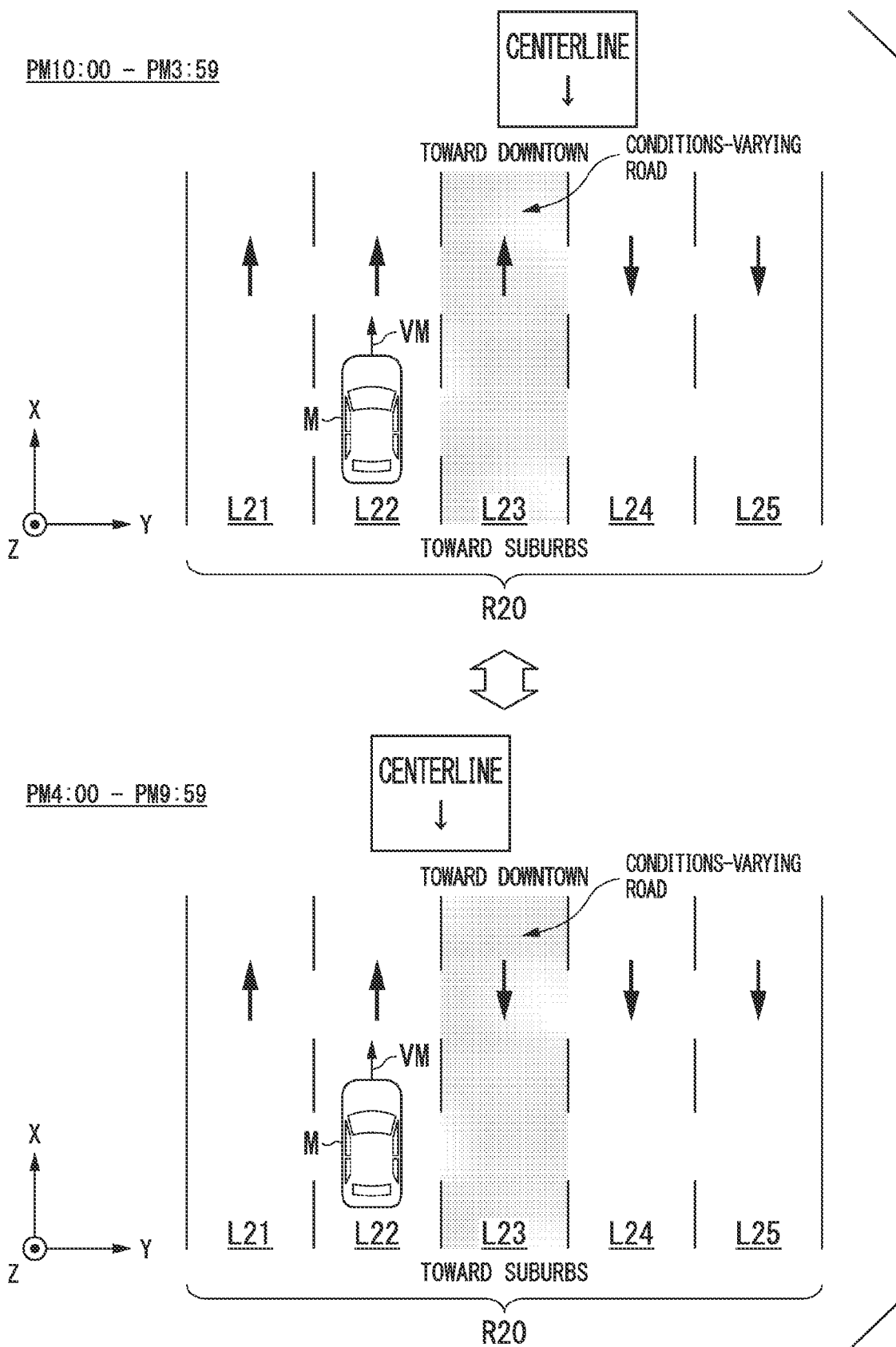
FIG. 5 is a diagram illustrating travel control of a vehicle M based on a third control rule.

Travel control of a vehicle M based on a third control rule will be described below. FIG. 5 is a diagram illustrating travel control of the vehicle M based on the third control rule. In the example illustrated in FIG. 5, a road R20 of five lanes including lanes L21 to L25 extending in the X-axis direction is illustrated. In an example of the third control rule, it is assumed that the road ID of the road R20 is "RD003." The conditions-varying road determiner 132 performs retrieval with reference to the road IDs in the conditions-varying road information 192 using the road ID "RD003" as a retrieval key and acquires conditions variation information including travel conditions in which a travel direction of a vehicle traveling in the lane L23 changes according to a time period as a result of retrieval.

In the travel conditions of the road R20, specifically, a road marking line partitioning the lane L23 and the lane L24 serves as a centerline in a time period in the morning, the daytime, or the nighttime (10:00 P.M. to 3:59 P.M.) and the lane L23 serves as a road from suburbs toward downtown similarly to the lanes L21 and L22. A road marking line partitioning the lane L22 and the lane L23 serves as a centerline in a time period from dusk to the night (4:00 P.M. to 9:59 P.M.) and the lane L23 serves as a road from downtown toward suburbs similarly to the lanes L24 and L25.

When the aforementioned conditions variation information is acquired, the travel controller 142 causes the vehicle M to travel in the lane L21 or L22 in which the travel direction does not change according to the time period when the vehicle M is caused to travel from suburbs to downtown as the third control rule. When the vehicle M is caused to travel from downtown to suburbs, the travel controller 142 causes the vehicle M to travel in the lane L24 or L25 in which the travel direction does not change according to the time period. In this way, according to the third control rule, since control for changing details of the behavior of the vehicle M does not need to be performed according to the time period by causing the vehicle M to travel in a lane in which the travel direction does not change regardless of the time periods, it is possible to decrease a processing load for travel control.

<Fourth Control Rule>

Figure 6:
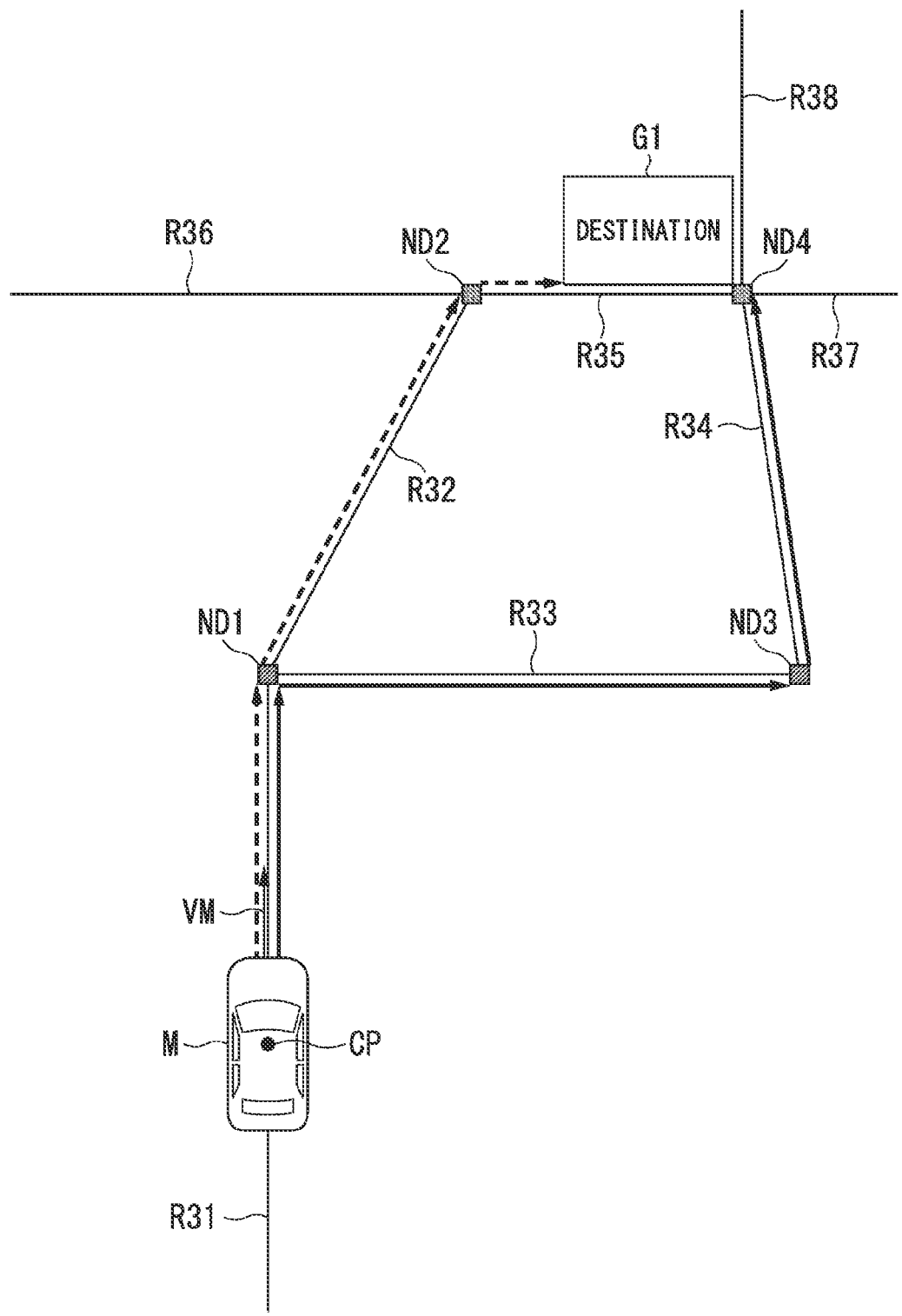
FIG. 6 is a diagram illustrating travel control of a vehicle M based on a fourth control rule.

Travel control of a vehicle M based on a fourth control rule will be described below. FIG. 6 is a diagram illustrating travel control of the vehicle M based on the fourth control rule. In the example illustrated in FIG. 6, roads R31 to R38 which are identified by road links and nodes ND1 to ND4 connecting the roads are illustrated. In the example illustrated in FIG. 6, it is assumed that the vehicle M travels on the road R31 to node ND1 at a speed VM.

In an example of the fourth control rule, the travel controller 142 causes the vehicle M to travel on a road other than a conditions-varying road according to the time period, for example, when the road on which the vehicle M travels includes the conditions-varying road. For example, when the road on which the vehicle M travels is a conditions-varying road in which travel permissibility of the vehicle M varies according to the time periods, the travel controller 142 causes the vehicle M to travel on a road other than the conditions-varying road regardless of a time period in which travel of the vehicle M is permissible.

For example, when a destination G1 is input by the navigation device 50, the route determiner 53 retrieves a route from a current position CP of the vehicle M to the destination G1 with reference to the first map information 54. Here, it is assumed that a route of roads R31→R32→R35 in which a distance from the current position CP to the destination G1 is the shortest is acquired as a result of retrieval. Here, it is assumed that the road R32 is a conditions-varying road with a road ID "RD004." In this case, the conditions-varying road determiner 132 determines that the route includes a conditions-varying road.

As the fourth control rule, the travel controller 142 causes the navigation device 50 to retrieve a route for reaching the destination G1 via a route in which the road R32 including the conditions-varying road is excluded. Then, the travel controller 142 performs travel control such that the vehicle M reaches the destination G1 on the basis of a new route (roads R31→R33→R34) not including the conditions-varying road. In this way, according to the fourth control rule, when a road includes a conditions-varying road, travel conditions of the road are made not to vary according to the time periods by controlling the vehicle such that it travels on roads other than the conditions-varying road and thus it is possible to decrease a processing load for travel control.

In the fourth control rule, instead of determining a route as described above, for example, the route determiner 53 may retrieve a route not including a conditions-varying road at a time point at which the destination G1 is input by the navigation device 50 and a route from the current position CP of the vehicle M to the destination G1 is first retrieved with reference to the first map information 54. Accordingly, since the vehicle can be controlled such that the vehicle travels on a road other than the conditions-varying road without determining whether the route to the destination G1 includes a conditions-varying road, it is possible to decrease a processing load for retrieving a route.

When a route not including a conditions-varying road is retrieved, the route determiner 53 may retrieve a route to the destination G1 with reference to map information not including a conditions-varying road in advance instead of the first map information 54. The route determiner 53 may determine a route using automated-driving map information including roads (travel paths) except a conditions-varying road when the vehicle M is caused to travel by automated driving, and determine a route using manual-driving map information (for example, the first map information 54) including a conditions-varying road when the vehicle M is caused to travel by manual driving. The automated-driving map information is stored, for example, in the navigation device 50 or the storage 190. It is possible to determine a more appropriate route by selectively using map information including a conditions-varying road (manual-driving map information or the first map information 54) and map information not including a conditions-varying road (automated-driving map information) depending on circumstances of the vehicle M (for example, whether it travels by automated driving) in this way.

<Fifth Control Rule>

Travel control of a vehicle M based on a fifth control rule will be described below. In the fifth control rule, for example, when a route of roads R31→R32→R35 is acquired through retrieval of a route from the current position CP of the vehicle M to the destination G1, the travel controller 142 switches travel control on the road R32 including a conditions-varying road from automated driving to manual driving. In this way, according to the fifth control rule, when the vehicle M travels on a road including a conditions-varying road, control for switching to manual driving is performed regardless of the time periods even if travel permissibility on the road varies according to the time periods, and thus it is possible to decrease a processing load for travel control. For example, the fifth control rule applies to a situation in which the vehicle cannot arrive at the destination G1 without traveling on a conditions-varying road. In the fifth control rule, the travel controller 142 may perform control for automatically switching travel control of the vehicle M from manual driving to automated driving after traveling from the road R32 to the road R35 not including a conditions-varying road.

Each of the first to fifth control rules may be combined with a part or all of other control rules. For example, the travel controller 142 performs control such that the vehicle M travels at a lower speed limit by employing the second control rule when travel conditions of a conditions-varying road indicate change of the speed limit according to the time periods and the vehicle M travels on a route not including the conditions-varying road on the basis of the fourth control rule when the travel conditions of the conditions-varying road indicate others. Since travel on the conditions-varying road is not excessively curbed by switching between a plurality of control rules according to the travel conditions or the like in this way, it is possible to more appropriately realize travel control of the vehicle M. A pattern of combination of the control rules is not limited to the aforementioned example.

[HMI Controller]

Details of the function of the HMI controller 180 will be described below. For example, in the fourth or fifth control rule, when the navigation device 50 retrieves a route from the current position CP of the vehicle M to the destination G1, the HMI controller 180 acquires candidates for a route (roads) from the current position CP of the vehicle M to the destination G1 and outputs information indicating the acquired candidates for a route to the HMI 30. In this case, the HMI controller 180 outputs information including a route not including a conditions-varying road and a route including a conditions-varying road as the candidates for a route to the HMI 30 and allows an occupant to select a route.

Figure 7:
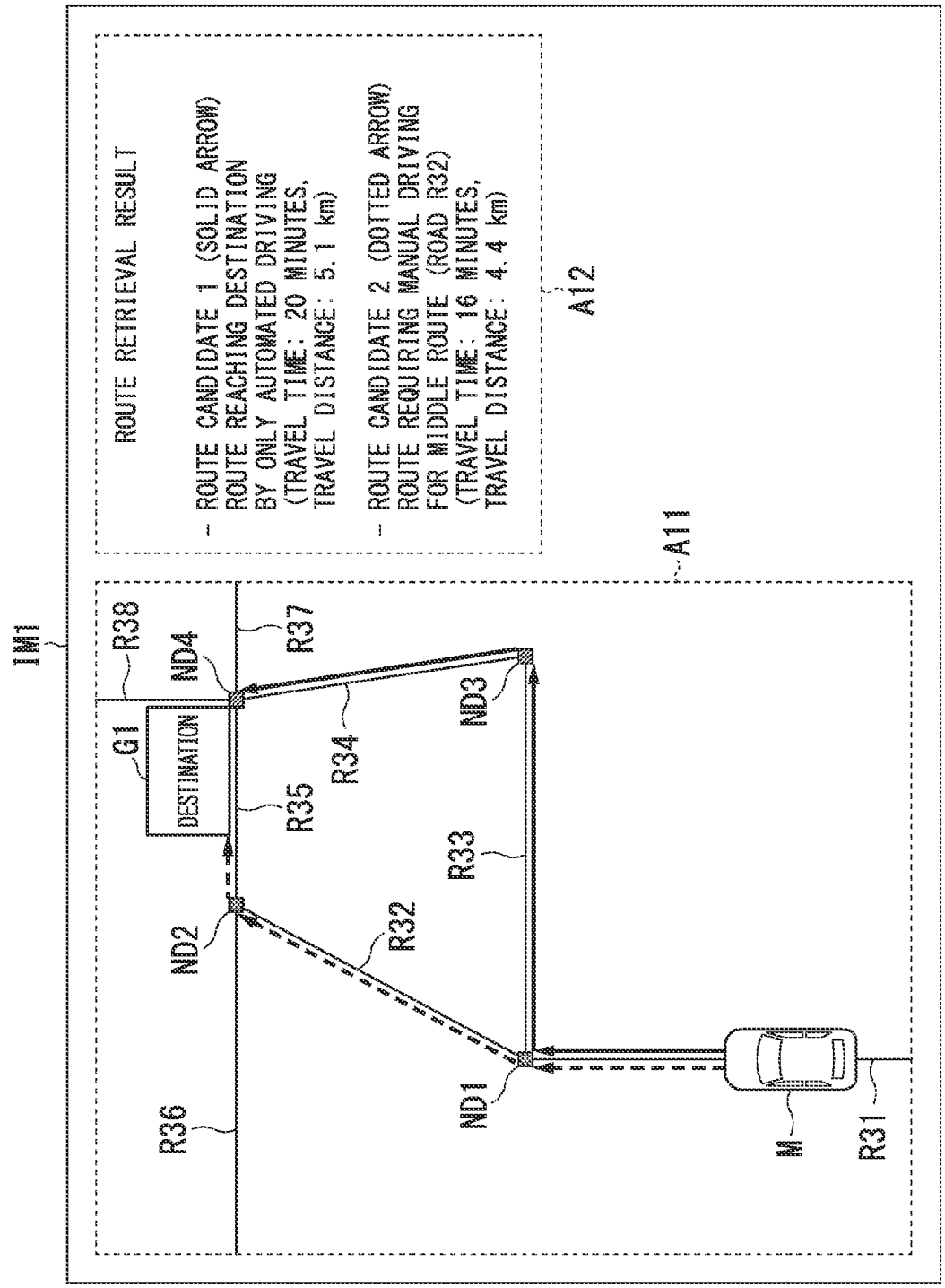
FIG. 7 is a diagram illustrating an example of an image representing candidates for a route according to the embodiment.

FIG. 7 is a diagram illustrating an example of an image IM1 indicating candidates for a route according to the embodiment. Information or a layout included in the image IM1 is not limited to the example illustrated in FIG. 7. In the example illustrated in FIG. 7, since position information CP of the vehicle M, a destination G1, and a surrounding environment of the vehicle M represent the same situation as illustrated in FIG. 6, detailed description of the situation will be omitted. The image IM1 includes, for example, a route image display area A11 and a route retrieval result display area A12.

For example, an image indicating the vehicle M, the destination G1, roads R31 to R38 near the vehicle M, and nodes ND1 to ND4 is displayed in the route image display area A11. For example, an image indicating information on a candidate for a route not including a conditions-varying road (route candidate 1 indicated by a solid arrow in FIG. 7) and a candidate for a route including a conditions-varying road (route candidate 2 indicated by a dotted arrow in FIG. 7) is displayed in the route retrieval result display area A12. As illustrated in FIG. 7, the information on a route may include information on a travel time or a travel distance to the destination G1.

When the vehicle travels on a conditions-varying road and control for switching automated driving to manual driving at the time of traveling is performed as in the fifth control rule, the HMI controller 180 may include information indicating that manual driving is necessary in the middle of the route (a road R32) in the information on a route. The images which are displayed in the route image display area A11 and the route retrieval display area A12 are generated, for example, by the HMI controller 180.

By presenting a route including a conditions-varying road (for example, a route in which a travel time is short and manual driving is necessary) and a route not including a conditions-varying road (for example, a route in which the travel time is long and a vehicle can travel by only automated driving) to an occupant in this way, it is possible to allow the occupant to select a more appropriate route according to circumstances of the occupant or the surrounding conditions of the vehicle M. The travel controller 142 performs control such that the vehicle M travels along the route selected by the occupant.

Before retrieving a route to an input destination, the HMI controller 180 may cause the HMI 30 to output information for inquiring of an occupant about which of a route not including a conditions-varying road and a route including a conditions-varying road is to be preferentially retrieved and cause the navigation device 50 to perform route retrieval having priority in the route selected by the occupant.

[Process Flow]

Figure 8:
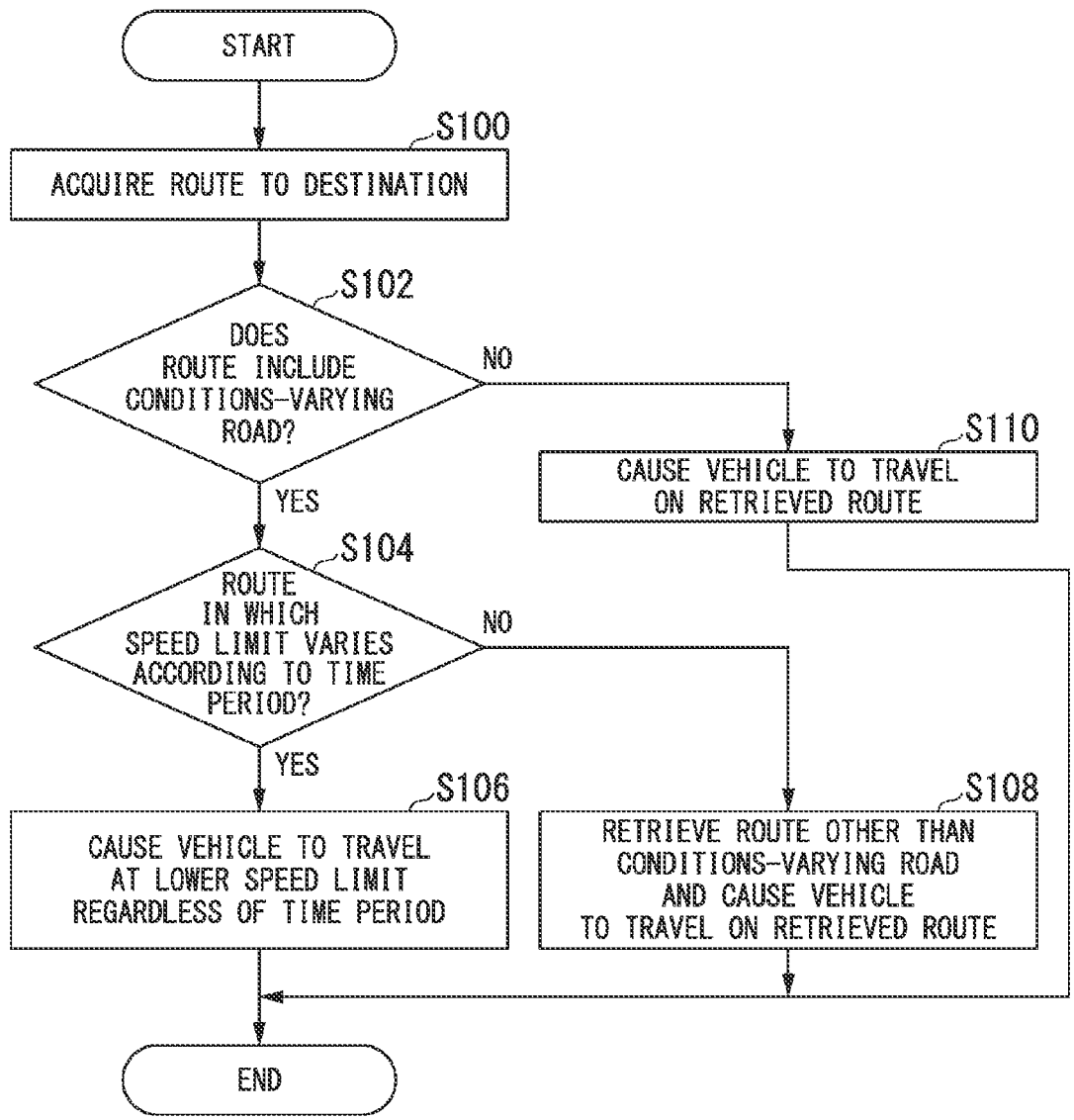
FIG. 8 is a flowchart illustrating an example of a flow of processes which are performed by an automated driving control device according to the embodiment.

FIG. 8 is a flowchart illustrating an example of a flow of processes which are performed by the automated driving control device 100 according to the embodiment. In the following description, a process of travel control (traveling control) of the vehicle M on a conditions-varying road will be mainly described out of the processes which are performed by the automated driving control device 100. In the following description, it is assumed that a travel control process is performed on a route to a destination which is input by an occupant. The flow of processes illustrated in FIG. 8 may be performed at a predetermined timing or repeatedly with a predetermined cycle.

In the flow of processes illustrated in FIG. 8, the conditions-varying road determiner 132 acquires a route from a current position of the vehicle M to a destination which is retrieved by the navigation device 50 or the like (Step S100). Then, the conditions-varying road determiner 132 determines whether the route to the destination includes a conditions-varying road (Step S102). When it is determined that the route includes a conditions-varying road, the conditions-varying road determiner 132 determines whether the conditions-varying road is a road in which the speed limit varies according to time periods (Step S104). When it is determined that the conditions-varying road is a road in which the speed limit varies according to time periods, the travel controller 142 causes the vehicle to travel at a lower speed out of speeds included in the travel conditions regardless of the time periods (Step S106). The process of Step S106 corresponds to travel control based on the second control rule. When it is determined in Step S104 that the conditions-varying road is not a road in which the speed limit varies according to time periods (that is, a road in which travel conditions other than the speed limit vary), the travel controller 142 retrieves a route other than the conditions-varying road and causes the vehicle to travel along the retrieved route (Step S108). The process of Step S108 corresponds to travel control based on the fourth control rule.

When it is determined in Step S102 that the route does not include a conditions-varying road, the travel controller 142 performs travel control such that the vehicle travels along the retrieved route (Step S110). In this embodiment, instead of the flow of processes illustrated in FIG. 8, the first controller 120 may determine a route not including a conditions-varying road when the route determiner 53 determines the route to the destination.

According to this embodiment, a control device (for example, the automated driving control device 100) includes the travel controller 142 that causes a vehicle (an example of a mobile object) M to travel autonomously, and the travel controller 142 controls the vehicle M such that a behavior in which control details for the vehicle M do not change even if travel conditions of a conditions-varying road in which travel conditions vary according to the time period are able to vary is performed. Accordingly, it is possible to decrease a processing load for travel control of the vehicle M.

Specifically, according to the embodiment, since control details of the behavior of the vehicle do not need to be changed even when a road on which the vehicle M travels includes a conditions-varying road, it is possible to decrease a processing load for travel control and to decrease development costs for control of the behavior according to time periods. According to the embodiment, when a route to a destination includes a conditions-varying road, the vehicle can be caused to travel normally without using the conditions-varying road by retrieving a road other than the conditions-varying road again and causing the vehicle to travel along the retrieved road. Accordingly, it is not necessary to change control details of automated driving according to time periods and it is possible to decrease a processing load for travel control.

According to the embodiment, since the vehicle is caused to travel on the conditions-varying road at a lower speed limit when the travel conditions of the conditions-varying road are conditions associated with the speed limit and the vehicle is caused to travel on a road other than the conditions-varying road when the travel conditions are conditions other than the speed limit, it is possible to decrease a processing load for travel control and to prevent excessive curbing of use of the conditions-varying road, thereby realizing more appropriate travel control. In the field of automated driving control, the vehicle M needs to be controlled more rapidly and accurately on the basis of change in a surrounding environment or a behavior of a nearby object (for example, another vehicle). Accordingly, by decreasing a processing load for travel control according to the embodiment, it is possible to rapidly perform other important control and to realize more appropriate automated driving control.

[Modified Examples]

Figure 9:
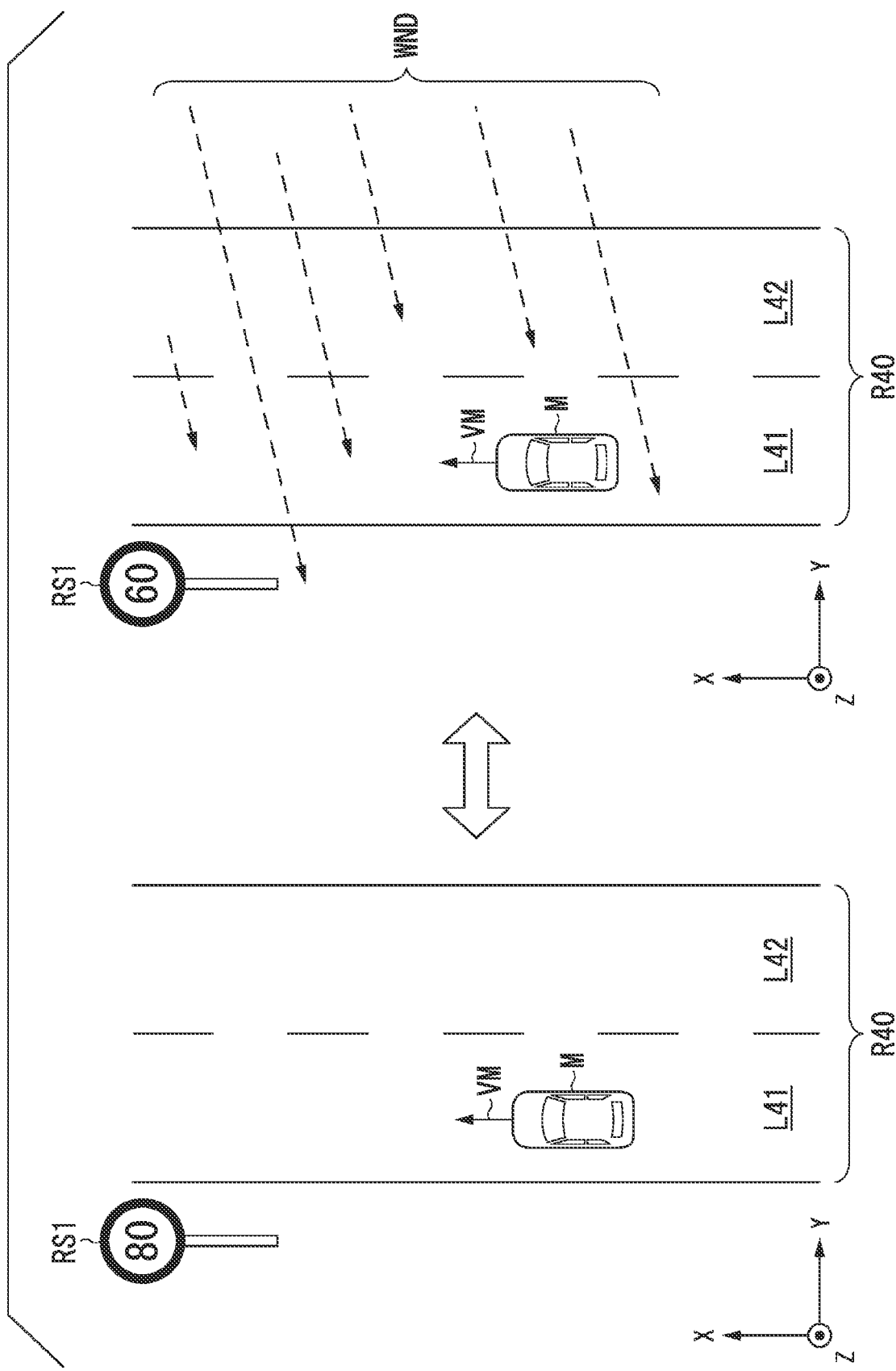
FIG. 9 is a diagram illustrating travel control of a vehicle when the vehicle travels on a road in which travel conditions of a conditions-varying road vary according to a natural environment around the road.

The aforementioned embodiment may apply to a case in which travel conditions of a conditions-varying road vary according to a natural environment such as a wind speed (strong wind, storm) or the weather (heavy snow, heavy rain) instead of (or in addition to) a case in which the travel conditions vary according to the time periods. FIG. 9 is a diagram illustrating travel control of a vehicle when the vehicle travels on a conditions-varying road in which the travel conditions vary according to the natural environment near the road. In the example illustrated in FIG. 9, a road R40 of two lanes including lanes L41 and L42 extending in the X-axis direction is illustrated. The lanes L41 and L42 are lanes travelable in the same direction. In the example illustrated in FIG. 9, a road sign RS1 indicating the speed limit of the road R40 is installed in the vicinity of the road. The road sign RS1 is, for example, a variable sign. The variable sign is, for example, a sign in which the speed limit which is displayed can be changed according to the time periods or by a remote operation from an external device. In the example illustrated in FIG. 9, a direction of wind WND is schematically illustrated. In the example illustrated in FIG. 9, the speed limit of the road R40 is 60 [km/h] in a strong-wind state and is 80 [km/h] in a non-strong-wind state (a normal state). This change of travel conditions is performed, for example, by an external device.

For example, when the vehicle M is caused to travel on the road R40, the conditions-varying road determiner 132 communicates with the external device via the communication device 20, transmits information for identifying the road R40 and information on the current natural environment (for example, wind WND) to the external device, and inquires about information about whether the travel conditions of the road R40 were changed due to strong wind in the past and information on the travel conditions. On the basis of a response from the external device, the conditions-varying road determiner 132 determines that the road R40 is a conditions-varying road when the travel conditions (for example, the speed limit) were changed due to strong wind in the past, and determines that the road R40 is not a conditions-varying road when the travel conditions have not been changed due to strong wind.

For example, when the road R40 is a conditions-varying road and the travel conditions are information on the speed limit, there is a likelihood that the wind WND will become strong in the near future and the speed limit will be switched even when the wind WND is not strong (the speed limit of the road sign RS1 is not 60 [km/h]), and thus the travel controller 142 causes the vehicle M to travel on the road R40 at a speed VM based on the lowest speed limit (60 [km/h] in the example illustrated in FIG. 9) out of the speed limit of the past travel conditions. When the road R40 is a conditions-varying road and the travel conditions are not information on the speed limit, the travel controller 142 causes the vehicle M to travel on a road other than the road R40.

Figure 10:
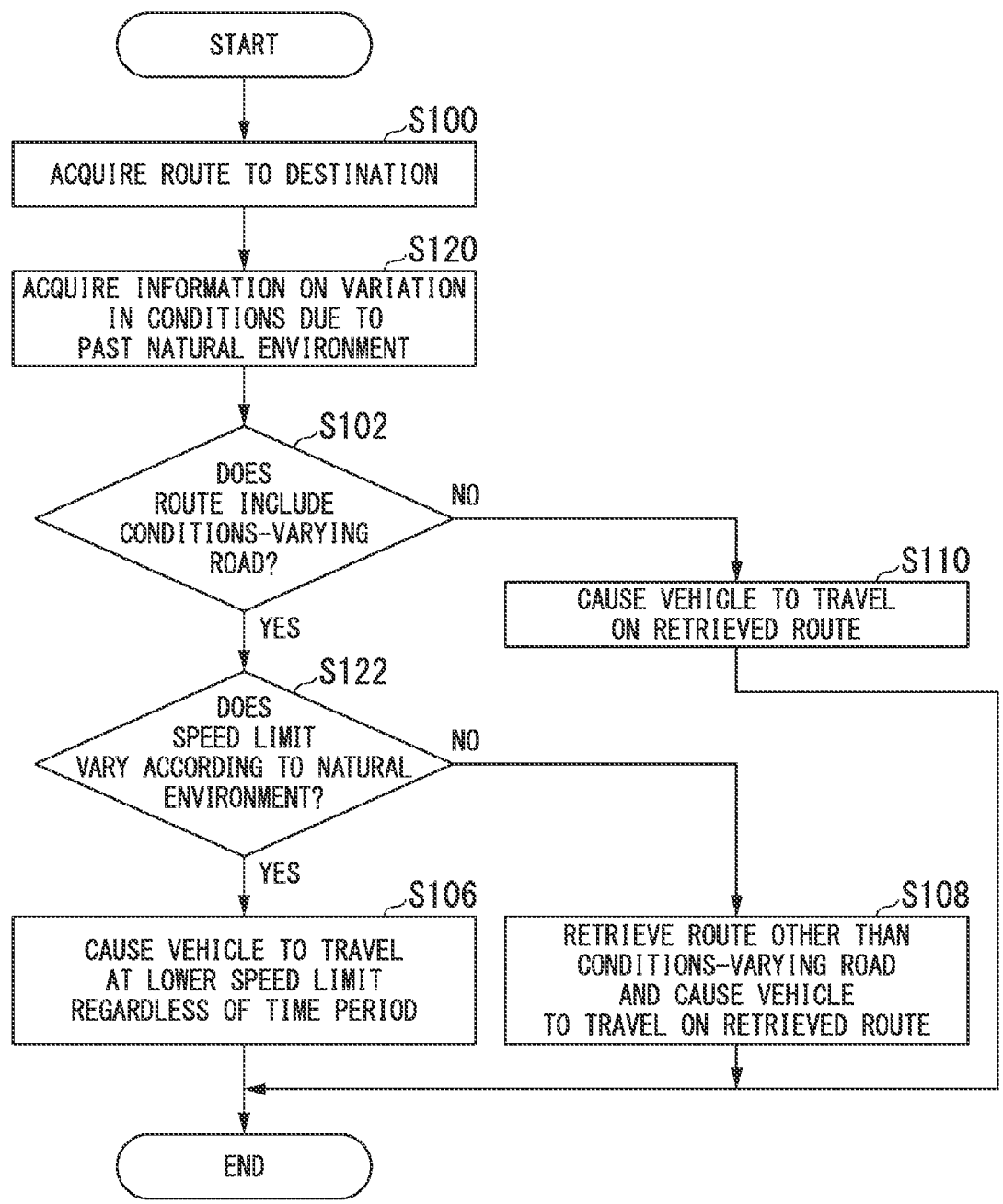
FIG. 10 is a flowchart illustrating an example of a flow of processes which are performed by an automated driving control device according to a modified example.

FIG. 10 is a flowchart illustrating an example of a flow of processes which are performed by the automated driving control device 100 according to a modified example. The flow of processes illustrated in FIG. 10 is different from the flow of process illustrated in FIG. 8, in that the processes of Steps S120 to S122 are added instead of the process of Step S104. Accordingly, the processes of Steps S120 to S122 will be mainly described below.

After the process of Step S100 in FIG. 10, the conditions-varying road determiner 132 communicates with the external device and acquires information on past condition variation associated with a route (for example, information on whether travel conditions have varied and information on travel conditions) (Step S120). Then, the conditions-varying road determiner 132 determines whether the route includes a conditions-varying road using the information acquired in the process of Step S120 (information acquired from the external device) (Step S102).

When it is determined in Step S102 that the route includes a conditions-varying road, the conditions-varying road determiner 132 determines whether the speed limit has changed due to the natural environment (Step S122). The travel controller 142 performs the process of Step S106 when it is determined that the speed limit has changed due to the natural environment, and performs the process of Step S108 when it is determined that the speed limit has not changed due to the natural environment.

According to the aforementioned modified example, even when the travel conditions of a conditions-varying road vary due to the natural environment, it is possible to perform travel control such that a behavior in which details of the travel control of the vehicle M do not change even when the natural environment changes is performed by causing the vehicle M to travel on the basis of the lowest speed limit or to travel on a route other than the conditions-varying road using the past history of the travel conditions. As a result, it is possible to decrease a processing load for travel control. In the aforementioned modified example, the travel control has been performed on the basis of the past travel conditions based on the natural environment, but when travel conditions based on preset natural environments are stored in the external device, the same travel control as described above may be performed using the information.

In another modified example of the embodiment, the conditions-varying road information 192 may be stored in an external device instead of the storage 190. In this case, the conditions-varying road determiner 132 communicates with the external device via the communication device 20, transmits information on a road on which the vehicle M travels to the external device, and inquires about whether the road is a conditions-varying road or acquires conditions variation information.

[Hardware Configuration]

Figure 11:
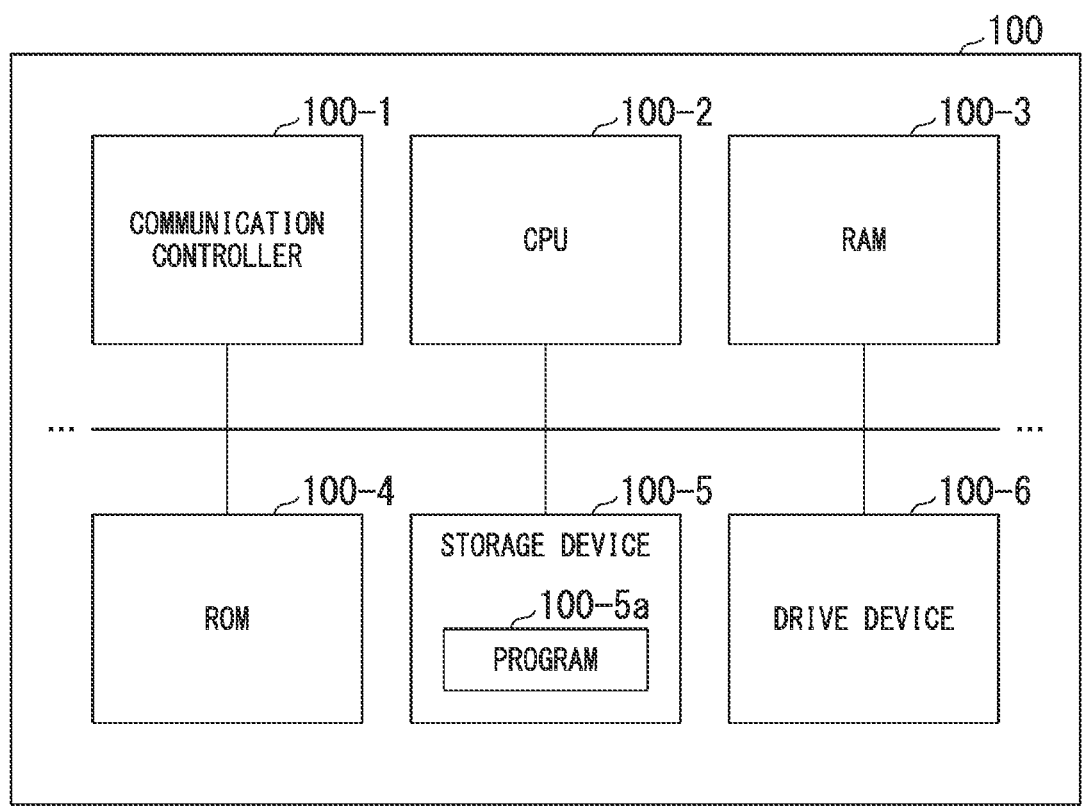
FIG. 11 is a diagram illustrating an example of a hardware configuration of an automated driving control device according to the embodiment.

FIG. 11 is a diagram illustrating an example of a hardware configuration of the automated driving control device 100 according to the embodiment. As illustrated in the drawing, a computer of the automated driving control device 100 has a configuration in which a communication controller 100-1, a CPU 100-2, a random access memory (RAM) 100-3 that is used as a work memory, a read only memory (ROM) 100-4 that stores a booting program or the like, a storage device 100-5 such as a flash memory or a hard disk drive (HDD), a drive device 100-6, and the like are connected to each other via an internal bus or a dedicated communication line. The communication controller 100-1 communicates with elements other than the automated driving control device 100. A portable storage medium (for example, a non-transitory computer-readable storage medium) such as an optical disc is set into the drive device 100-6. A program 100-5a which is executed by the CPU 100-2 is stored in the storage device 100-5. This program is loaded into the RAM 100-3 by a direct memory access (DMA) controller (not illustrated) or the like and is executed by the CPU 100-2. The program 100-5a which is referred to by the CPU 100-2 may be stored in a portable storage medium that is set into the drive device 100-6 or may be downloaded from another device via a network. Accordingly, some or all of the constituents of the automated driving control device 100 are realized.

The above-mentioned embodiment can also be expressed as follows:

a control device including:
a storage device that stores a program; and
a hardware processor,
wherein, by executing the program stored in the storage device, the hardware processor is configured to perform:
causing a mobile object to travel autonomously,
controlling the mobile object such that a behavior in which control details for the mobile object do not change even if travel conditions of a conditions-varying travel path in which the travel conditions vary according to a time period vary is performed.

While the invention has been described with reference to embodiments, the invention is not limited to the embodiments and can be subjected to various modifications and substitutions without departing from the gist of the invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control device comprising:
a processor that executes instructions to:
cause a mobile object to travel autonomously,
wherein the processor controls the mobile object based on a conditions-varying travel path such that an automated control of the mobile object does not change even if travel conditions of the conditions-varying travel path vary wherein the travel conditions vary according to a time period,
wherein the processor further executes instructions to determine a route to a destination,
wherein the processor determines the route using automated-driving map information that comprises a travel path other than the conditions-varying travel path when the mobile object travels by automated driving, and determines the route using manual-driving map information that comprises the conditions-varying travel path when the mobile object travels by manual driving,
wherein the travel conditions include travel limits or a travel rule.

2. The control device according to claim 1,
wherein the processor further executes instructions to:
determine whether a travel path along which the mobile object travels under the control of the processor includes a conditions-varying travel path in which travel conditions vary according to the time period,
wherein the processor controls the mobile object such that the automated control of the mobile object does not change even if the travel conditions of the conditions-varying travel path vary when the processor determines that the travel path includes the conditions-varying travel path.

3. The control device according to claim 1, wherein the processor causes the mobile object to travel along the conditions-varying travel path on a basis of a lower speed limit out of speed limits included in the travel conditions regardless of the time period when the conditions-varying travel path is a travel path in which a speed limit varies according to the time period.

4. The control device according to claim 2, wherein the processor causes the mobile object to travel along a travel path other than the conditions-varying travel path regardless of the time period when the processor determines that the travel path includes the conditions-varying travel path.

5. The control device according to claim 4, wherein the processor causes the mobile object to travel along a travel path other than the conditions-varying travel path regardless of a time period in which travel of the mobile object is permissible when the conditions-varying travel path is a travel path in which travel permissibility of the mobile object varies according to the time period.

6. The control device according to claim 1, wherein the processor causes the mobile object to travel along the conditions-varying travel path on a basis of a lower speed limit out of speed limits included in the travel conditions regardless of the time period when a variation of the travel conditions of the conditions-varying travel path is a variation in speed limit, and wherein the processor causes the mobile object to travel along a travel path other than the conditions-varying travel path when the variation of the travel conditions of the conditions-varying travel path is not a variation in speed limit.

7. The control device according to claim 1, wherein the processor switches the mobile object to manual driving control such that the mobile object is driven by a person's operation regardless of the time period when the mobile object is caused to travel along the conditions-varying travel path when the variation of the travel conditions of the conditions-varying travel path is not a variation in speed limit.

8. The control device according to claim 1, wherein the processor further executes instructions to:
acquire candidates for a travel path from a current position of the mobile object to the destination and to cause an output to output information indicating the acquired candidates for a travel path, wherein the processor causes the output to output information including a travel path not including the conditions-varying travel path and a travel path including the conditions-varying travel path as the candidates for a travel path.

9. The control device according to claim 1, wherein the processor further executes instructions to:
determine whether the travel path along which the mobile object travels under the control of the processor includes a conditions-varying travel path in which travel conditions vary according to a natural environment, wherein the processor controls the mobile object such that the automated control of the mobile object does not change even if the travel conditions of the conditions-varying travel path vary when the processor determines that the travel path includes the conditions-varying travel path.

10. A control method which is performed by a computer, the control method comprising:
causing a mobile object to travel autonomously; controlling the mobile object based on a conditions-varying travel path such that an automated control of the mobile object does not change even if travel conditions of the conditions-varying travel path vary,
wherein the travel conditions vary according to a time period,
determining a route to a destination;
determining the route using automated-driving map information that comprises a travel path other than the conditions-varying travel path when the mobile object travels by automated driving; and determining the route using manual-driving map information that comprises the conditions-varying travel path when the mobile object travels by manual driving,
wherein the travel conditions include travel limits or a travel rule.

11. A non-transitory computer-readable storage medium storing a program, the program causing a computer to perform:
causing a mobile object to travel autonomously;
controlling the mobile object based on a conditions-varying travel path such that an automated control of-the mobile object does not change even if travel conditions of the conditions-varying travel path vary,
wherein the travel conditions vary according to a time period;
determining a route to a destination;
determining the route using automated-driving map information that comprises a travel path other than the conditions-varying travel path when the mobile object travels by automated driving; and determining the route using manual-driving map information that comprises the conditions-varying travel path when the mobile object travels by manual driving,
wherein the travel conditions include travel limits or a travel rule.

* * * * *